United States Patent [19]
Miller

[11] Patent Number: 5,630,321
[45] Date of Patent: May 20, 1997

[54] METHOD AND APPARATUS FOR FREEZING

[75] Inventor: Jeremy P. Miller, Berks, Great Britain

[73] Assignee: Air Products and Chemicals, Inc., Allentown, Pa.

[21] Appl. No.: 367,911

[22] Filed: Jan. 3, 1995

Related U.S. Application Data

[63] Continuation of Ser. No. 196,671, Feb. 15, 1994, abandoned.

[30] Foreign Application Priority Data

Feb. 17, 1993 [GB] United Kingdom ............. 9303212

[51] Int. Cl.⁶ .......................... F25D 13/06; F25D 17/02
[52] U.S. Cl. .................. 62/63; 62/64; 62/65; 62/374; 62/380
[58] Field of Search ........................ 62/63, 64, 65, 62/373, 374, 380

[56] References Cited

U.S. PATENT DOCUMENTS

| | | | |
|---|---|---|---|
| 850,216 | 4/1907 | Dornfeld | 239/486 |
| 2,305,210 | 12/1942 | Wahlin | 239/463 X |
| 3,072,346 | 1/1963 | Wahlin et al. | 239/463 X |
| 3,214,928 | 11/1965 | Oberdorfer | 62/374 X |
| 3,531,946 | 10/1970 | Hart | 62/332 |
| 3,746,262 | 7/1973 | Bete et al. | 239/463 X |
| 4,086,784 | 5/1978 | Wagner | 62/374 |
| 4,406,407 | 9/1983 | Aprea et al. | 239/487 |
| 4,813,245 | 3/1989 | Hubert et al. | 62/380 |
| 4,966,003 | 10/1990 | Shima | 62/63 |
| 5,054,292 | 10/1991 | Klee | 62/63 |

*Primary Examiner*—Christopher Kilner
*Attorney, Agent, or Firm*—Robert J. Wolff

[57] ABSTRACT

A tunnel freezer is cooled by selectively supplying liquid nitrogen to banks of spray nozzles. The banks are switched on and off as required so that at any given time the pressure upstream of each operational spray nozzle will be substantially constant at a level which closely approximates the maximum heat transfer coefficient associated with the spray nozzle or the maximum effectiveness of the spray nozzle or a balance therebetween. The invention is in contrast to the prior art where the flow of liquid nitrogen to the spray nozzles is continuously varied in response to the thermal load.

12 Claims, 7 Drawing Sheets

METHOD AND APPARATUS FOR FREEZING

This is a continuation of application Ser. No. 08/196,671 filed on 15 Feb. 1994, now abandoned.

FIELD OF THE INVENTION

This invention relates to a method and apparatus for freezing.

BACKGROUND OF THE INVENTION

In conventional freezing tunnels liquid nitrogen is admitted to the freezing tunnel through a plurality of spray nozzles. The flow of liquid nitrogen to the spray nozzles is continuously varied by a flow control valve in response to the difference in temperature at a point in the freezing tunnel and a set temperature. In a typical installation, after initial cooldown, the flow through each spray nozzle is varied from 0 l/s to $1.4 \times 10^{-2}$ l/s which corresponds to a pressure immediately upstream of the spray nozzle (i.e. downstream of the flow control valve) of from 0 to 1 bar (gauge).

We have discovered that the heat transfer coefficient for any given spray nozzle varies with the flow through the spray nozzle and that, in many cases, the heat transfer coefficient is particularly high over a very narrow range of flow. Since flow is a function of the pressure applied upstream of the spray nozzle it therefore follows that the heat transfer coefficient for any given spray nozzles varies with the pressure immediately upstream of the spray nozzle. In addition, we have discovered that the effectiveness of any given spray nozzle also varies with the pressure immediately upstream of the spray nozzle.

In general, the higher the heat transfer coefficient the quicker a product will be frozen. Similarly, the higher the effectiveness the greater will be the proportion of the available refrigeration which will be applied to the product to be frozen.

SUMMARY OF THE INVENTION

The present invention is based on the concept of rather than infinitely varying the flow rate through a spray nozzle, and thus the pressure immediately upstream of the spray nozzle, one should effect cooling by maintaining the pressure immediately upstream of the spray nozzle substantially constant while it is in use, and switching it on and off as required.

According to one aspect of the present invention there is provided a method of freezing, which method comprises the steps of connecting one or more banks of spray nozzles each comprising at least one spray nozzle to a source of a cryogen so that said at least one spray nozzle operates at a substantially constant pressure, and selectively connecting said bank(s) to said source in dependence on the heat load.

Typically, each bank will comprise at least three spray nozzles although it could conceivably comprise a single spray nozzle.

In the simplest case cooling may be achieved using a single bank of spray nozzles comprising just one spray nozzle. In this embodiment, at the commencement of a cooling operation (when the difference between the required temperature and the actual temperature is a maximum) the spray nozzle is put in continuous connection with the source of cryogen (typically liquid nitrogen).

Once the required temperature is reached the spray nozzle is isolated from the source of cryogen by, for example closing a solenoid valve. As the temperature rises the solenoid valve is actuated to allow cryogen to flow to the spray nozzle at source pressure until the desired temperature is reached. At this point the valve is closed. In a typical situation at low heat load the solenoid valve might permit liquid nitrogen to flow to the spray nozzle for five seconds every thirty seconds, whilst under normal heat load the solenoid valve might permit liquid nitrogen to flow to the spray nozzle for fifteen seconds every twenty seconds.

In a more common situation a freezing tunnel will be provided with at least three banks of spray nozzles.

In an embodiment with three banks of spray nozzles the first bank and the second bank of spray nozzles are preferably capable of delivering the same flow of cryogen and the third bank a flow equal to the sum of the first and second flows. This can be achieved by having twice as many spray nozzles in the third bank or by using larger spray nozzles.

During initial cooldown all three banks are connected to the source of cryogen. When the desired temperature is reached the banks are connected to the source of cryogen in dependence on the heat load. At low heat loads a solenoid opens and closes to admit liquid nitrogen to the first bank only. When the heat load increases the second bank is opened all the time and the solenoid associated with the first bank is opened and closed to provide additional cooling until the heat load increases beyond the combined capability of the first and second banks. At this point the third bank is connected to the source of cryogen, the second bank is switched off and the solenoid associated with the first bank is opened and closed to provide any incremental heat load. As the heat load increases still further the second bank is reconnected to the source of cryogen and the solenoid connected with the first bank opened and closed to provide any incremental heat load up to the full cooling capacity of the freezer.

It will be appreciated that the second and third banks are generally on or off for relatively long periods whilst the spray nozzles associated with the first bank are being switched on and off—typically several times a minute—to trim the system.

In a system using four or more banks of spray nozzles each bank may be designed to provide substantially equal flows.

Tests carried out indicate that spray nozzles which include an orifice and a swirling device upstream of the orifice may be preferable to conventional spray nozzles which do not include swirling devices.

Operating at a high heat transfer coefficient means that the product is cooled rapidly whilst operating at a high effectiveness means that a large proportion of the refrigeration available in the cryogen is transferred to the product.

If the criteria is rapid cooling, preferably, the substantially constant pressure corresponds to the pressure at which the spray nozzle produces at least 50%, more preferably 75%, and advantageously 90% of its maximum heat transfer coefficient.

Alternatively, if high effectiveness is required the substantially constant pressure may correspond to the pressure at which the spray nozzle is substantially at its highest effectiveness.

It is conceivable that certain spray nozzles may be at their highest effectiveness at the same pressure at which they provide their highest heat transfer coefficient. However, at present it appears that these optimums occur at slightly different pressures. For good all round performance it is recommended that the constant pressure corresponds to a pressure between which said spray nozzle is at its highest effectiveness and at which it provides its maximum heat transfer coefficient.

Advantageously, said spray nozzle includes an orifice and a swirling device upstream of said orifice.

The present invention also provides an apparatus for carrying out a method in accordance with the invention, which apparatus comprises at least one bank of spray nozzles comprising at least one spray nozzle connectable to a source of cryogen, an ON/OFF valve for allowing or preventing cryogen flowing from said source to said bank, and means for actuating said ON/OFF valve in response to the heat load on said apparatus.

Preferably, said ON/OFF valve is a solenoid controlled valve.

Advantageously, said apparatus comprises at least first, second and third banks of spray nozzles.

Preferably, said first and second banks of spray nozzles are capable of supplying substantially equal volumes of cryogen and said third bank is capable of supplying a volume of cryogen substantially equal to the sum of the flows of cryogen from said first and second bank of spray nozzles.

Advantageously, said means for actuating said ON/OFF valve in response to the heat load on said apparatus comprises a computer.

Preferably, said computer can control each of said spray nozzles independently of one another.

Advantageously, said computer is arranged to control said spray nozzles as a function of the product to be frozen.

Preferably, at least one of said spray nozzles comprise an orifice and a swirling device upstream of said orifice.

For a better understanding of the present invention reference will now be made, by way of example, to the accompany drawings, in which:

DETAILED DESCRIPTION OF THE PREFERRED EMBODIMENTS

Figure 1:
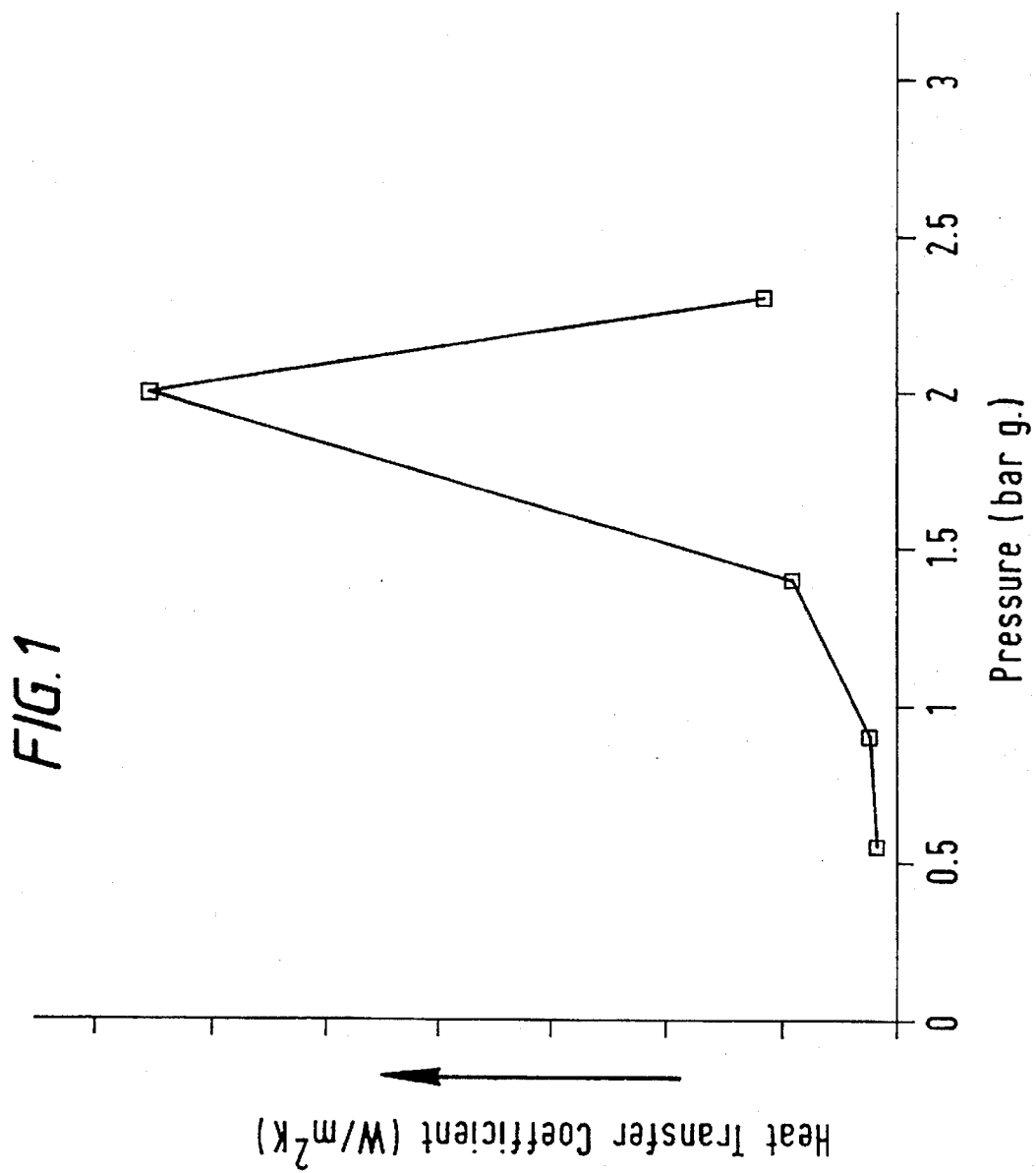
FIG. 1 is a graph showing the heat transfer coefficient between liquid nitrogen leaving a spray nozzle and a surface plotted as a function of the pressure immediately upstream of the spray nozzle.

Referring to FIG. 1 of the drawings the heat transfer coefficient between liquid nitrogen leaving a spray nozzle and a sheet of material beneath the spray nozzle was measured and was plotted as a function of the pressure of the liquid nitrogen immediately upstream of the spray nozzle.

The spray nozzle was a conventional ACM 10 manufactured by Delavan Limited of Widnes, Cheshire, UK and used in some of the applicant's conventional tunnel freezers.

It will be seen that the heat transfer coefficient increases marginally as the pressure increases from 0.5 to 0.9 bar (gauge). It then increases more rapidly up to 1.4 bar (gauge).

As the pressure is increased to 2 bar (gauge) the heat transfer coefficient increases very rapidly and then falls off equally rapidly as the pressure increases from 2 to 2.3 bar (gauge).

Figure 2:
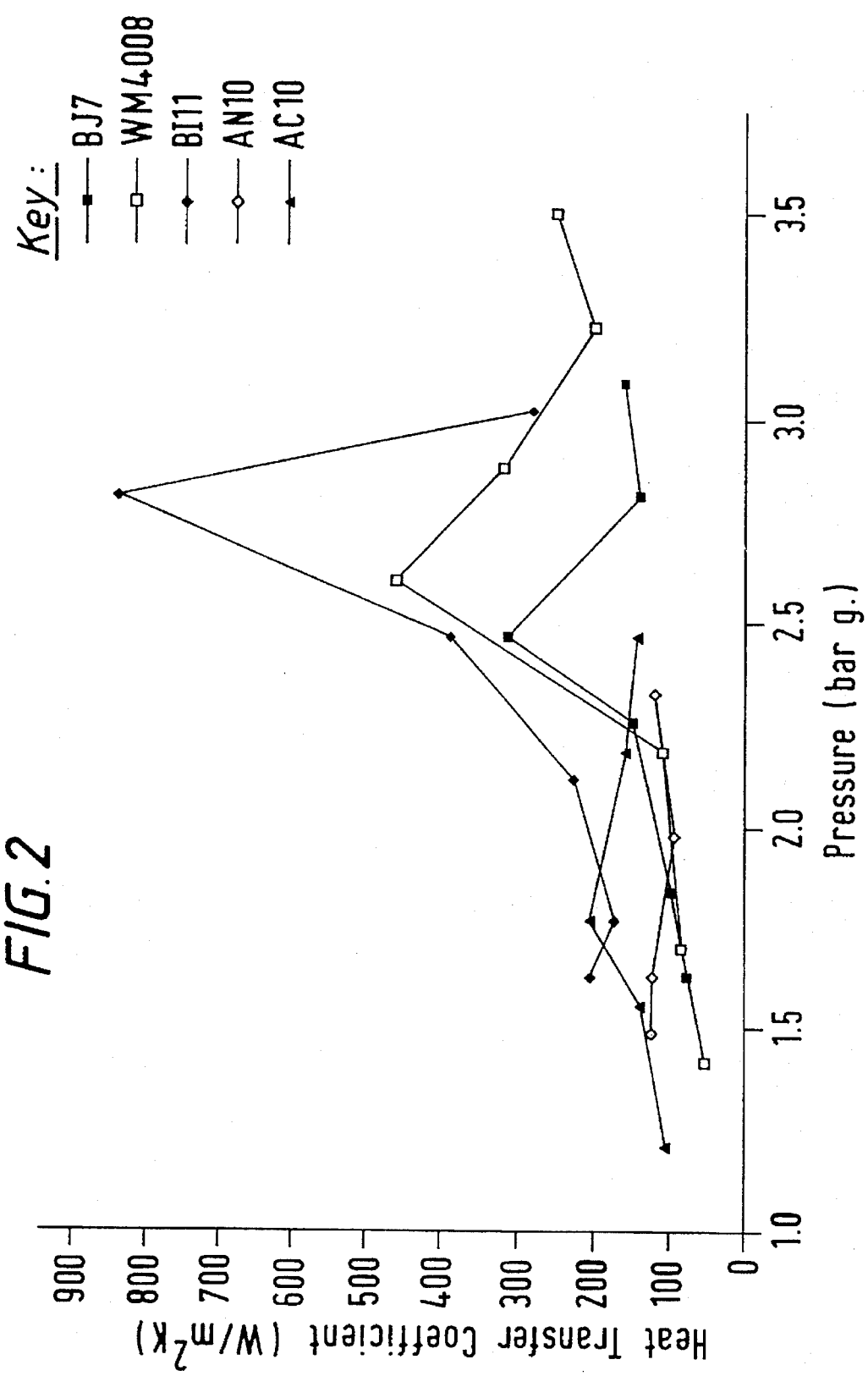
FIG. 2 is a graph showing the heat transfer coefficient between liquid nitrogen leaving various different spray nozzles and a surface plotted as a function of the pressure immediately upstream of the spray nozzle.

Tests have been carried out with a variety of spray nozzles and each has its own characteristics. The results of the tests are shown in FIG. 2.

All spray nozzles tested are commercially available from Delavan Limited and are identified by their current catalogue numbers.

It will be appreciated that a high heat transfer coefficient reflects a high rate of cooling.

In the prior art temperature was controlled by continually varying the setting of a valve between a source of liquid nitrogen and a spray nozzle. Typically, after initial cooldown the pressure immediately upstream of the spray nozzle would be less than 1 bar (gauge). As can be seen from FIG. 1 the rate of heat transfer was extremely poor.

Figure 3:
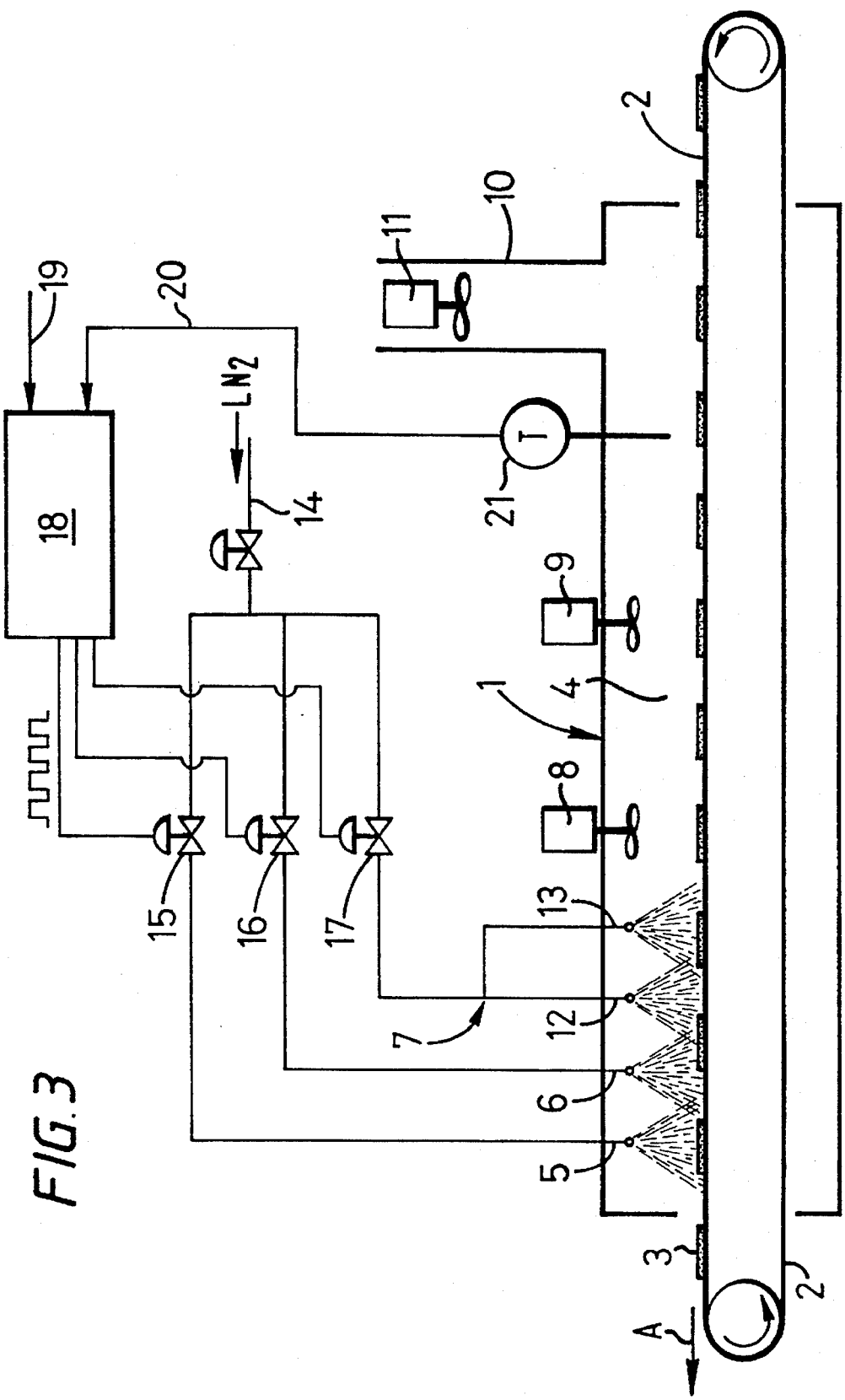
FIG. 3 is a simplified cross-section through an apparatus in accordance with the invention.

Referring now to FIG. 3, there is shown a tunnel freezer which is generally identified by reference numeral 1.

The tunnel freezer 1 comprises a conveyor 2 which carries hamburgers 3 through a tunnel 4 in the direction of the arrow A.

As the hamburgers 3 pass through the tunnel 4 they are cooled in counter-current heat exchange with cold nitrogen emitted from first, second and third banks 5, 6 and 7 of spray nozzles.

Heat exchange between the cold nitrogen and the hamburgers 3 is enhanced by turbulence inducing fans 8, 9 and the nitrogen vapour is extracted through exhaust duct 10 by extractor fan 11.

The first and second banks 5 and 6 of spray nozzles each comprise three spray nozzles whilst the third bank 7 comprises six spray nozzles arranged in two rows 12, 13. The spray nozzles are all substantially identical.

The first, second and third banks 5, 6 and 7 of spray nozzles are connected to a source 14 of liquid nitrogen which is maintained at a substantially constant pressure of 2.2 bar (gauge).

A solenoid valve 15 is disposed between the source 14 of liquid nitrogen and the first bank 5 of spray nozzles whilst solenoid valves 16 and 17 are disposed between the source 14 of liquid nitrogen and the second and third banks 6, 7 of spray nozzles respectively.

The solenoid valves 15, 16 and 17 are each ON/OFF valves which are biased to a closed position by a spring but which can be fully opened by actuating their respective solenoids.

The solenoid valves 15, 16 and 17 are controlled by a control unit 18 in response to the difference between a set point signal 19 and a signal 20 received from a temperature sensor 21 mounted in the tunnel freezer 1.

At the commencement of a freezing operation the freezing tunnel 1 is first pre-cooled. In particular, the signal 20 from the temperature sensor 21 is compared with the set point signal 19. Initially the difference between the two signals 19 and 20 is relatively large and the control unit opens solenoid valves 15, 16 and 17 to allow the first, second and third banks 5, 6 and 7 of spray nozzles to communicate with the source 14 of liquid nitrogen.

The spray nozzles used in the first, second and third banks 5, 6 and 7 are the same as the spray nozzles described with reference to FIG. 1. Since the source 14 of liquid nitrogen is at 2.2 bar (gauge) the spray nozzles are all operating at or close to maximum heat transfer efficiency, i.e., with an upstream pressure of substantially 2 bar (gauge) allowing for the pressure drop between the source 14 and immediately upstream of the spray nozzles.

As the temperature at temperature sensor 21 drops the difference between the signals 19 and 20 decreases until they are equal whereupon control unit 18 closes solenoid valves 15, 16 and 17.

As the temperature rises the difference between the signal 20 and the signal 19 increases until at a given difference (representative of 5° C. at the temperature sensor 21) the solenoid valve 15 opens to allow the spray nozzles in the first bank 5 to spray liquid nitrogen from source 14. When the signal 20 changes to equal set point 19 the solenoid valve 15 is closed.

Once the tunnel freezer 1 is pre-cooled hamburgers are carried through the tunnel 4 on conveyor 2. As the hamburgers enter and pass through the tunnel 4 they provide a heat load which results in the temperature at temperature sensor 21 rising.

As the heat load increases the duration for which the solenoid valve 15 remains open increases. When the solenoid valve 15 is open continuously solenoid valve 16 is opened. If the heat load is only marginally greater then can be accommodated by the first bank 5 of spray nozzles along solenoid valve 15 will only open and close intermittently to provide the small amount of additional refrigeration required.

As the heat load increases solenoid valve 16 remains open and solenoid valve 15 remains open for a greater duration. When solenoid valve 15 is open continuously solenoid valve 17 is opened and solenoid valve 16 closed. At this time solenoid valve 17 remains open continuously and any excess heat load is dealt with by opening and closing solenoid valve 15.

As the supply of hamburgers reaches the design capacity of the tunnel freezer 1 solenoid valve 16 is opened and cooling is provided by continuous flow from the second and third banks 6, 7 of spray nozzles together with intermittent flow from the first bank 5. This situation is shown in FIG. 3.

It will be appreciated that at any given time any spray nozzle which is in use is being supplied with liquid nitrogen at a constant pressure substantially corresponding to that pressure which gives the optimum heat transfer coefficient for the spray nozzle.

The advantages which flow from the present invention are very significant. In particular, cooling always occurs rapidly. In this connection it should be understood that the heat load applied to freezing tunnels is rarely constant. In particular, the supply of food to a conveyor is rarely uniform and the same freezing tunnel may be used for freezing a variety of products which may differ substantially one from another.

Various modifications to the embodiment described are envisaged, for example any number of banks of spray nozzles may be used and each bank may comprise one or more spray nozzles. The number of spray nozzles in each bank may differ as may the size of the spray nozzle although the pressure at which optimum heat transfer occurs should be substantially the same for all the spray nozzles in any bank.

Although not recommended, each bank may have spray nozzles with a common optimum operating pressure which is different from the optimum operating pressure of the spray nozzles in another bank. In this case each bank is associated with its own source of liquid nitrogen at the appropriate pressure for its spray nozzles.

Whilst it is preferred to use solenoid valves, the valves may comprise any form of ON/OFF valve. Whilst valves 16 and 17 are actuable at a relatively leisurely pace solenoid valve 15 should be capable of opening and closing quickly. If desired valves 15, 16 and 17 could be pneumatically or hydraulically controlled.

Tests on a number of commercially available spray nozzles indicate that optimum heat transfer occurs with a pressure immediately upstream of the spray nozzle of from 2–4 bar gauge.

Whilst it is desirable to ensure that the pressure immediately upstream of the spray nozzles is at the optimum it will be appreciated that considerable improvement in the rate of cooling over the prior art may be achieved by operating near the optimum and, as can clearly be seen from FIG. 1, very satisfactory results may still be obtained when the pressure upstream of the spray nozzle conforms to only 50% of the maximum heat transfer coefficient. We would however recommend that the source pressure be maintained to provide at least 75%, and advantageously, at least 90% of the maximum heat transfer coefficient.

In a particularly sophisticated embodiment, a plurality of spray nozzles, for example 30 spray nozzles, are disposed in a tunnel freezer. Each spray nozzle is connected to a source of liquid nitrogen which is maintained at a substantially constant pressure corresponding substantially to the optimum operating pressure of the spray nozzle. Each spray nozzle can be actuated by its own solenoid valve which is controlled by a computer.

The computer is programmed to operate the solenoid valves as a function of the total refrigeration requirements and, preferably, as a function of the produce to be frozen.

More particularly, when the tunnel freezer is initially cooled the computer will activate a single bank of spray nozzles comprising all the spray nozzles in the tunnel freezer.

Once the desired temperature is reached the computer will shut off all the spray nozzles with the exception of one or two to compensate for heat leak.

Food is then advanced into the tunnel freezer and the computer activates the spray nozzles in accordance with the refrigeration load and the produce.

It will be recalled that many freezer tunnels are used to freeze a variety of products. One day they may be used for freezing hamburgers, on another ducks, chickens or even turkeys.

To facilitate understanding it will be assumed that a tunnel freezer is to be used to freeze turkeys. Typically, the turkeys will be placed on the centre of the conveyor 2 one behind the other. In such an embodiment the computer activates the spray nozzles situated along the centre line of the tunnel freezer and to either side thereof, the number of spray nozzles actuated depending on the refrigeration requirements. However, the spray nozzles adjacent the side walls of the tunnel freezer are not activated. In contrast, if the product to be frozen is of substantially uniform thickness and substantially uniformly distributed over the conveyor, for example hamburgers, then the computer will open all the solenoid valves across the width of the freezing tunnel as and when required.

It is anticipated that there will be an optimum combination of spray valves which should be opened for supplying a given refrigeration requirement to a given product and that this will have to be determined by practical experiment for each product.

In general, the higher the heat transfer coefficient the more rapidly a product will be frozen and the shorter the freezing tunnel need be.

Figure 4:
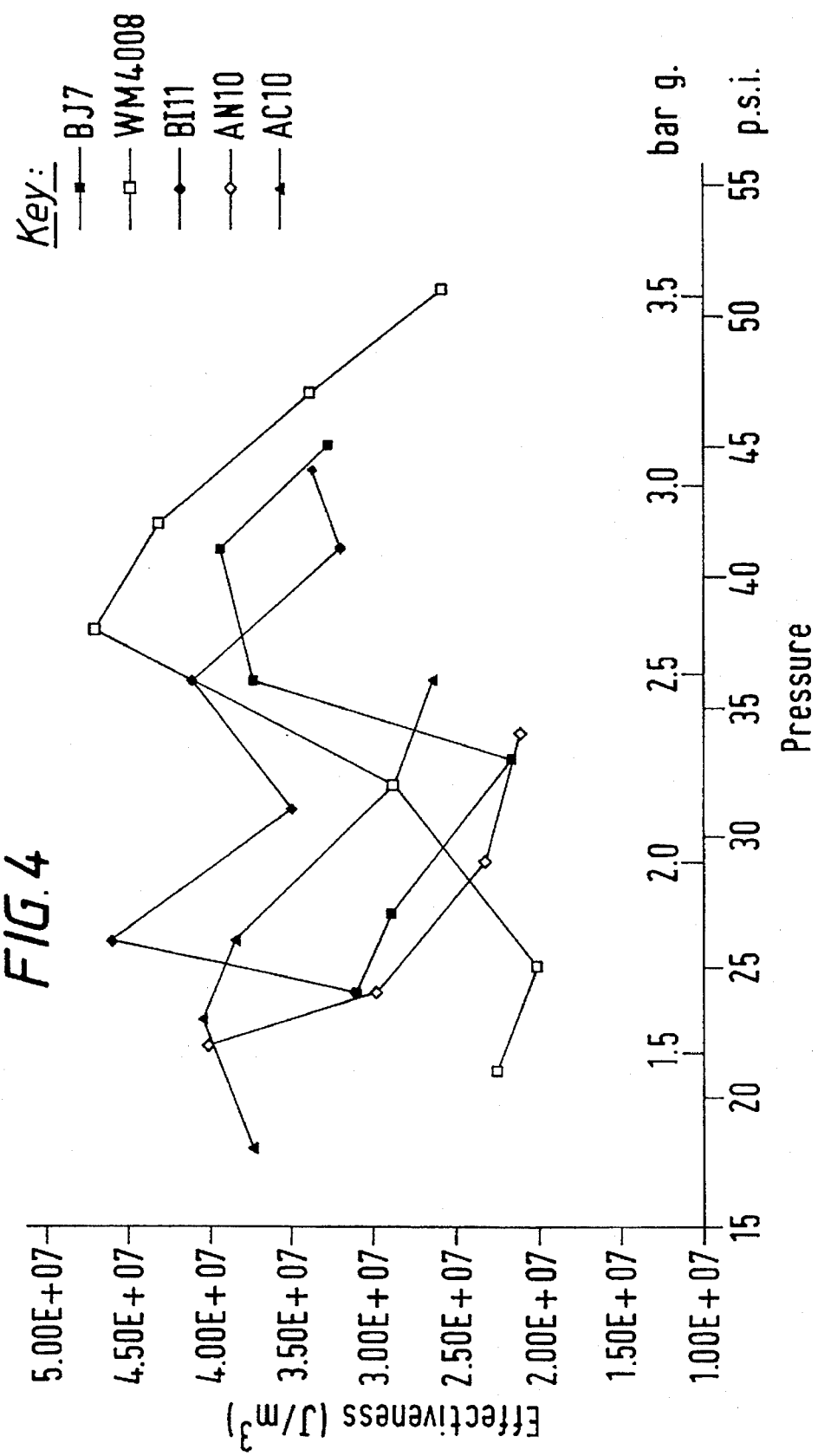
FIG. 4 is a graph showing the "effectiveness" of the spray nozzles of FIG. 2 as a function of the pressure immediately upstream of the spray nozzle.

Turning now to FIG. 4, there is shown a graph of the "effectiveness" of the previous nozzles plotted as a function of the pressure immediately upstream of the nozzle. The "effectiveness" is a measure of the cooling of a given product for a given amount of cryogen. Low effectiveness is indicative of an inefficient process whilst high effectiveness is indicative of an efficient process in which a substantial portion of the cold available in the liquid nitrogen is used to cool the product.

It will be noted that there was a substantial variation between the spray nozzles. Thus nozzle WM 4008 was the most inefficient nozzle tested at 1.7 bar g but the most efficient at about 2.5 bar g. In contrast nozzle BI 11 displayed acceptable effectiveness throughout its tested range from 1.7 bar g to about 3 bar g.

Figure 5:
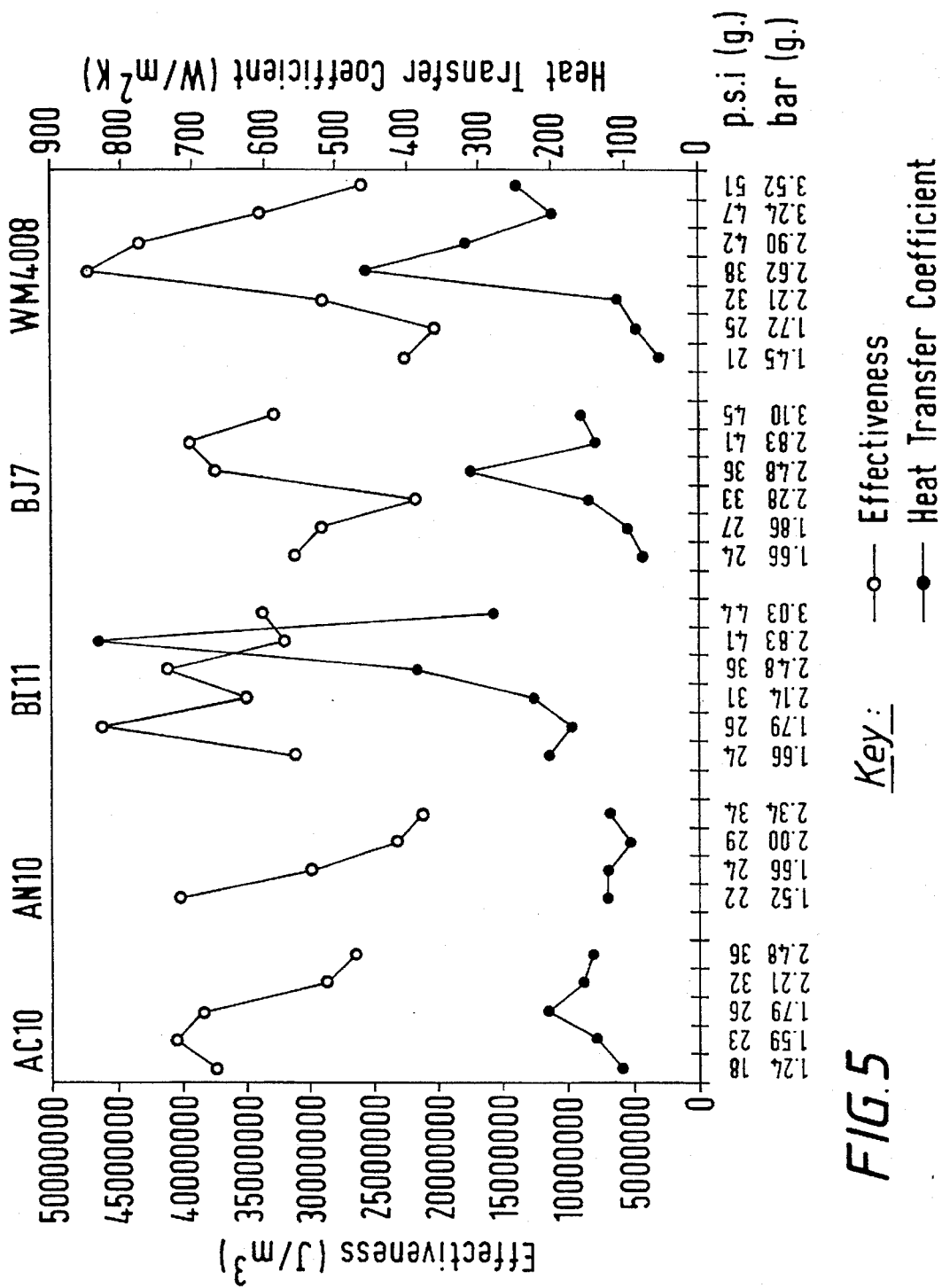
FIG. 5 is a graph comparing the effectiveness and heat transfer coefficients at different pressures for each of the spray nozzles of FIG. 2.

Desirably, freezing tunnels should be designed to offer the most acceptable balance between high heat transfer coefficient (low capital cost) and high effectiveness (low operating cost). In addition the freezing tunnel must be controllable in so far as minor differences in supply pressure must not make a drastic difference to the operation of the freezing tunnel. On balance, as can be seen from FIG. 5, nozzle BI 11 operating at 2.5 bar g offers a good compromise. Increasing pressure to 2.8 bar g will significantly increase freezing rate at the cost of some effectiveness whilst slightly reducing the pressure to 2.4 bar g will reduce the freezing rate whilst increasing effectiveness.

Nozzles BI 11, WM 4008 and BJ7 showed significantly improved overall performance over nozzles AN10 and AC10. On closer examination it was found that whilst all the nozzles tested included an orifice the three preferred nozzles included a swirling chamber upstream of the orifices. Each swirling chamber included a different design of swirling device for imparting rotational motion to the cryogen prior to passing through the orifice.

Figure 6:
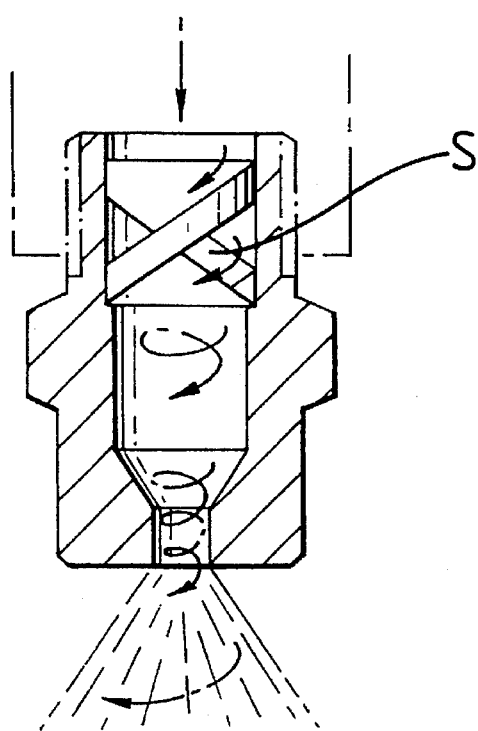
FIGS. 6, 7 and 8 are simplified cut away views of preferred spray nozzles.
Figure 7:
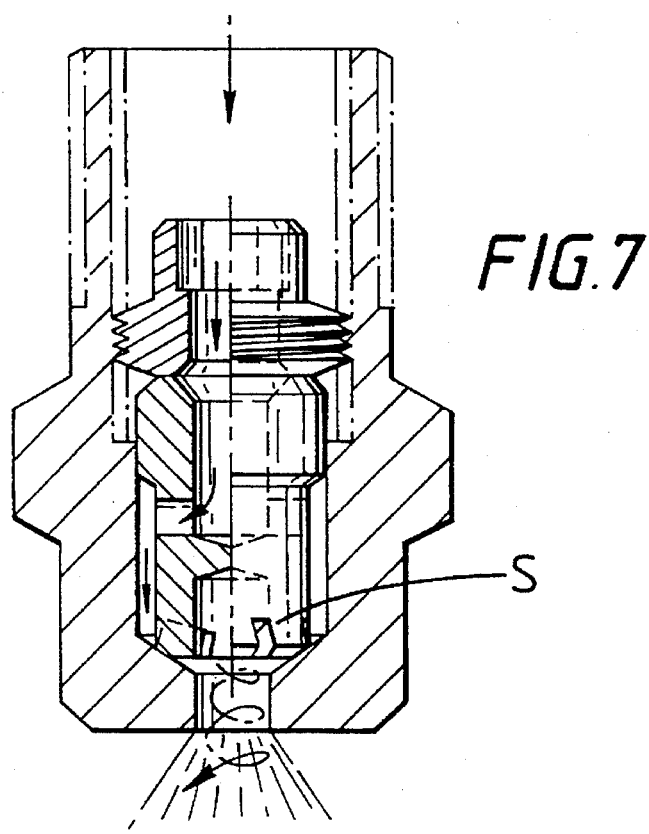
Figure 8:
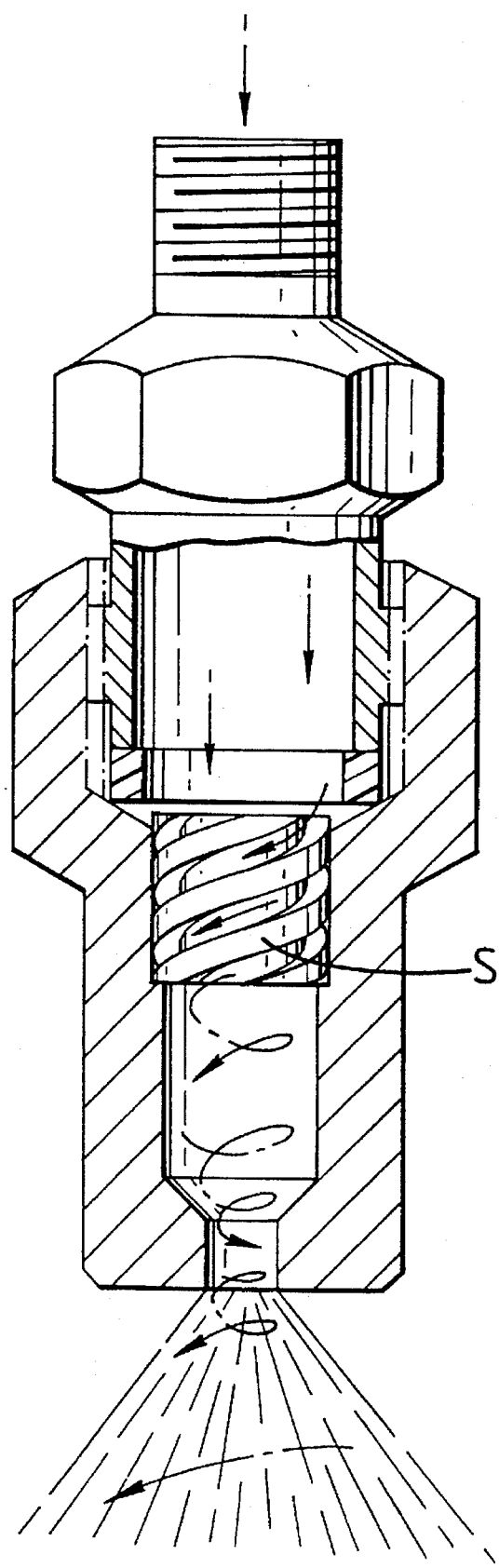

FIGS. 6, 7 and 8 show simplified cut away views of the BI 11, WM 4008 and BJ 7 spray nozzles respectively in which the respective swirling devices have been identified by the letter "S".

What is claimed is:

1. A method of freezing articles, which method comprises the steps of:
    installing at least two banks of spray nozzles, each bank having at least one spray nozzle of the type having a spray orifice and swirling device upstream of said orifice in a freezing chamber, each nozzle in a bank being identical and selected to show optimum heat transfer at a pressure of liquid cryogen between 1.6 and 4 bar gauge immediately upstream of said nozzle;
    introducing a supply of liquid cryogen into each of said banks of spray nozzles;
    establishing a flow of cryogen through each of said nozzles in at least one bank of nozzles at the upstream pressure for the particular nozzle so that each of said nozzles provides at least 50% of its maximum heat transfer coefficient to articles to be cooled by said cryogen;
    pre-cooling said freezing chamber by maintaining flow of cryogen through at least one bank of nozzles until a desired operating temperature is reached in said freezing chamber; and
    maintaining said temperature in said freezing chamber by selectively initiating or terminating flow of cryogen through each of said first and or second banks of nozzles while maintaining a constant pressure of cryogen upstream of each nozzle.

2. A method according to claim 1, wherein said substantially constant pressure corresponds to the pressure at which each of said spray nozzles in a bank of nozzles provides at least 75% of its maximum heat transfer coefficient.

3. A method according to claim 1, wherein said substantially constant pressure corresponds to the pressure at which each of said spray nozzles in a bank of nozzles provides at least 90% of its maximum heat transfer coefficient.

4. A method according to claim 1, wherein said substantially constant pressure corresponds to the pressure at which each of said spray nozzles in a bank of nozzles is substantially at its highest effectiveness.

5. A method according to claim 1, wherein said substantially constant pressure corresponds to a pressure between which each of said spray nozzles in a bank of nozzles is at its highest effectiveness and at which it provides its maximum heat transfer coefficient.

6. A freezer comprising in combination:
    a freezing chamber having an inlet and an outlet and means to support and move articles to be frozen through said freezing chamber from said inlet to said outlet;
    means for introducing a liquid cryogen to contact said articles, said means including at least two banks of spray nozzles, each of said banks having at least one spray nozzle of the type having a spray orifice and a swirling device upstream of said orifice;
    pressure controlling means to maintain a constant pressure of between 1.6 and 4 bar gauge upstream of each of said nozzles in a bank of nozzles said pressure determined by the type of nozzle so that cryogen exiting said nozzle provides at least 50% of its maximum heat transfer coefficient in the vicinity of said articles as they are juxtaposed to said nozzle;
    temperature sensing means in said freezing chamber, and
    means to selectively provide liquid cryogen at the desired constant pressure to the interior of said freezing chamber through each of said banks of nozzles to maintain a desired low temperature in said freezing chamber.

7. An apparatus as claimed in claim 6, wherein said means to selectively provide liquid cryogen to each of said banks of spray nozzles includes an ON/OFF solenoid controlled valve.

8. An apparatus as claimed in claim 6, including first, second and third banks of spray nozzles.

9. An apparatus as claimed in claim 8, wherein first and second banks of spray nozzles are capable of supplying substantially equal volumes of cryogen and said third bank is capable of supplying a volume of cryogen substantially equal to the sum of the flows of cryogen from said first and second bank of spray nozzles.

10. An apparatus as claimed in claim 7, wherein said ON/OFF valve includes computer controlled actuating means responsive to the heat load introduced into said freezing chamber.

11. An apparatus as claimed in claim 10, wherein said computer is connected to separate valves adapted to control flow of cryogen separately to each of said banks of spray nozzles independently of one another.

12. An apparatus as claimed in claim 10, wherein said computer is arranged to control flow of cryogen through each bank of said spray nozzles in response to the type, size and temperature of the product to be frozen.

* * * * *